US010036296B1

(12) United States Patent
Chenoweth

(10) Patent No.: US 10,036,296 B1
(45) Date of Patent: Jul. 31, 2018

(54) CATALYST SUBSTRATE MOUNTING MAT

(71) Applicant: Caterpillar Inc., Peoria, IL (US)

(72) Inventor: Kurt Chenoweth, Ipava, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/472,899

(22) Filed: Mar. 29, 2017

(51) Int. Cl.
*F01N 3/10* (2006.01)
*F01N 3/28* (2006.01)
*B01D 53/94* (2006.01)
*F01N 13/08* (2010.01)

(52) U.S. Cl.
CPC .......... *F01N 3/2825* (2013.01); *B01D 53/94* (2013.01); *F01N 3/2853* (2013.01); *F01N 13/08* (2013.01); *F01N 2330/18* (2013.01)

(58) Field of Classification Search
CPC .. F01N 3/2864; F01N 2310/02; F01N 3/2853; Y10T 428/249921; Y10T 428/192
USPC ................................................ 422/179, 180
See application file for complete search history.

(56) References Cited

U.S. PATENT DOCUMENTS

| | | | | |
|---|---|---|---|---|
| 5,152,253 A | * | 10/1992 | Jenko | F22B 37/248 122/510 |
| 5,332,609 A | * | 7/1994 | Corn | F01N 3/2857 422/179 |
| 5,862,590 A | * | 1/1999 | Sakashita | F01N 3/2853 29/446 |
| 8,268,255 B2 | * | 9/2012 | Yoshimi | F01N 3/2853 422/179 |
| 8,328,986 B2 | * | 12/2012 | Kariya | B32B 5/26 162/129 |
| 2003/0091480 A1 | | 5/2003 | Yamaguchi et al. | |
| 2007/0048196 A1 | * | 3/2007 | Takeuchi | B26B 29/06 422/179 |
| 2007/0207069 A1 | * | 9/2007 | Kariya | F01N 3/0211 422/179 |
| 2009/0114097 A1 | * | 5/2009 | Saiki | B32B 7/02 96/10 |
| 2011/0030355 A1 | | 2/2011 | Gilmer et al. | |
| 2012/0269993 A1 | | 10/2012 | Weeks et al. | |
| 2015/0238898 A1 | | 8/2015 | Kleuderlein et al. | |

FOREIGN PATENT DOCUMENTS

DE 102004056804 A1 6/2006
WO WO 2016/036802 A1 3/2016

* cited by examiner

*Primary Examiner* — Tom P Duong
(74) *Attorney, Agent, or Firm* — Leydig, Voit & Mayer, LTD.

(57) ABSTRACT

An after-treatment device includes a first mat having an elongate shape and a second mat having an elongate shape. The first mat and the second mat are entwined, each being in contact with at least three of the four lateral surfaces of each of at least two substrates. Additionally, the first mat and the second mat at least partially overlap such that the first tongue is disposed at least partially in the second opening and the second tongue is disposed at least partially in the first opening to form a continuous layer around all lateral surfaces of each of the at least two substrates placed in an enclosure.

11 Claims, 5 Drawing Sheets

CATALYST SUBSTRATE MOUNTING MAT

TECHNICAL FIELD

This patent disclosure relates generally to internal combustion engines and, more particularly, to substrate mats used to pack catalyst substrates into enclosures.

BACKGROUND

Internal combustion engines are known to produce combustion byproducts that are abated by so-called after-treatment systems associated with the engine. Such after-treatment systems typically include one or more catalysts arranged on substrates, which are packed into enclosures and placed along a flow path of exhaust gases from the engine so they can treat and abate substances in the exhaust gas that are undesirable for release into the atmosphere.

In a typical installation, catalysts deposited on substrates, for example, ceramic substrates, are enclosed into a metal container, which is placed in the exhaust conduit of an engine. For achieving a proper fit, providing cushioning, and avoiding leakage of gases past the substrates, a mat is placed around the substrates. The mat, which may be made from ceramic fibers and is compressible, is placed between the substrates and the inner surface of the can when the can is assembled. Typically, during assembly, a considerable amount of customization is required to properly assemble the substrates into the can because there is wide tolerance and size variation of the substrates, especially square substrates. The customization includes custom cutting of the retention mats to meet the required space claims. The customization results in slow assembly and challenges in precut inventory since the mat size will not be known until assembly starts.

In the past, various solutions have been proposed to address the time consuming aspect of the required customizations. One example of a previously proposed solution can be seen in PCT Application Publication No. WO 2016/036802 A1, which published on Mar. 10, 2016 to Rochaz et al. ("Rochaz"). Rochaz describes a mounting mat for holding a substrate into a can. The mounting mat is sized to wrap around three lateral sides of a substrate such that, when four substrates are assembled together in a bundle, the bare side of each substrate is oriented to contact a matted side of an adjacent substrate so that all four substrates have a matted surface on all four lateral sides. While the solution proposed in Rochaz is effective in assembling a mat around substrates, it still does not address the issue of customization during assembly in that excess mounting mat material will still need to be manually removed from the edges of the mat to avoid overlap of adjacent mats when the bundle is put together.

SUMMARY

In one aspect, the disclosure describes an after-treatment device. The after-treatment device includes an enclosure configured to be disposed along an exhaust conduit of an engine, the enclosure having inlet and outlet openings, and at least two substrates disposed in the enclosure, each of the at least two substrates having two axial ends configured to be in fluid communication with the inlet and outlet openings, and four lateral surfaces that face an inner portion of the enclosure. The after-treatment device further includes a first mat having an elongate shape, the first mat being disposed at least partially around each of the at least two substrates, the first mat forming a first tongue at one end and a first opening along a first length thereof, and a second mat having an elongate shape, the second mat being disposed at least partially around each of the at least two substrates, the second mat forming a second tongue at one end and a second opening along a second length thereof. The first mat and the second mat are entwined, each being in contact with at least three of the four lateral surfaces of each of the at least two substrates. Additionally, the first mat and the second mat at least partially overlap such that the first tongue is disposed at least partially in the second opening and the second tongue is disposed at least partially in the first opening to form a continuous layer around all lateral surfaces of each of the at least two substrates.

In another aspect, the disclosure describes a method for assembling an after-treatment device. The method includes providing a first mat strip having two first tongues extending past the ends of the first mat, and two first openings formed along a body of the first mat strip, providing a second mat strip having two second tongues extending past the ends of the second mat, and two second openings formed along a body of the second mat strip, combining the first mat strip and the second mat strip to form a cross shape having four quadrants, placing four square substrates in the four quadrants such that each of the four substrates has a lateral side in contact with the first mat strip and a different lateral side in contact with the second mat strip, wrapping two free ends of each of the first mat strip and the second mat strip around two remaining lateral faces of each of the four substrates, and at least partially inserting one of the two first tongues of the first mat strip into a corresponding one of the two second openings in the second mat strip before insertion into an enclosure.

DETAILED DESCRIPTION

This disclosure relates to engines having after-treatment systems and, more particularly, after-treatment systems that include substrates mounted into cans with mats. The engines may be used in any type of marine or land-based mobile or stationary application.

Figure 1:
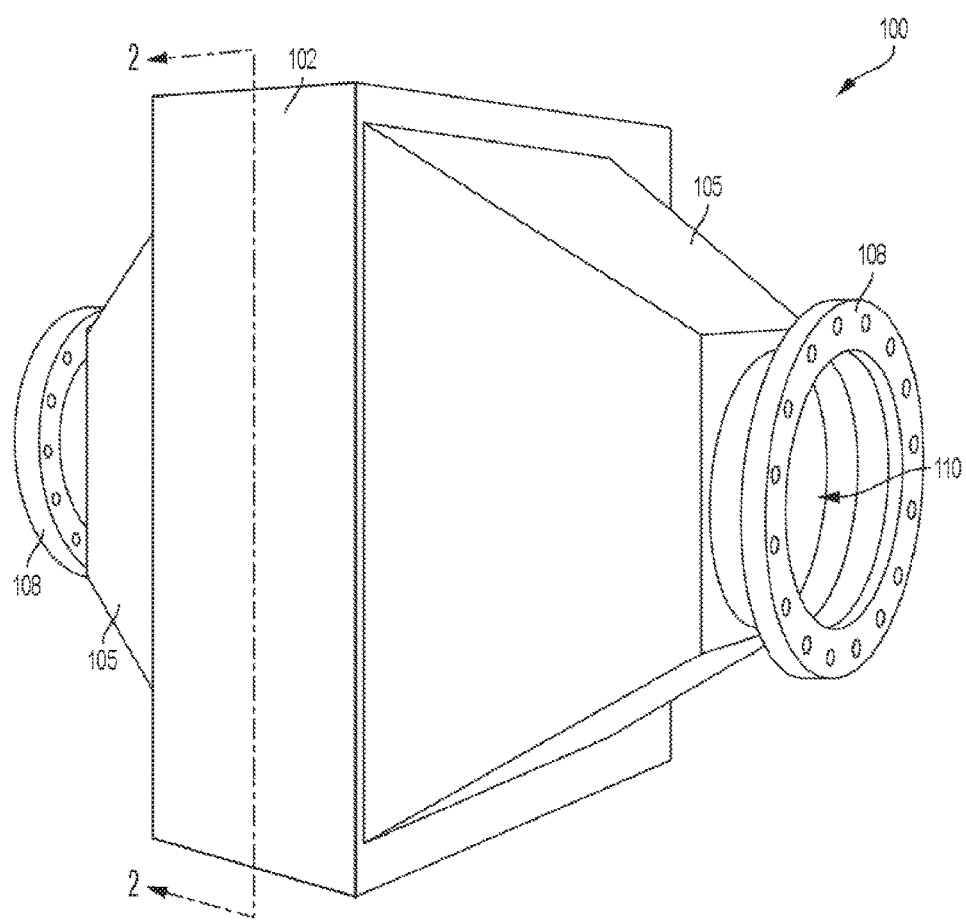
FIG. 1 is an outline view of an after-treatment device in accordance with the disclosure.
Figure 2:
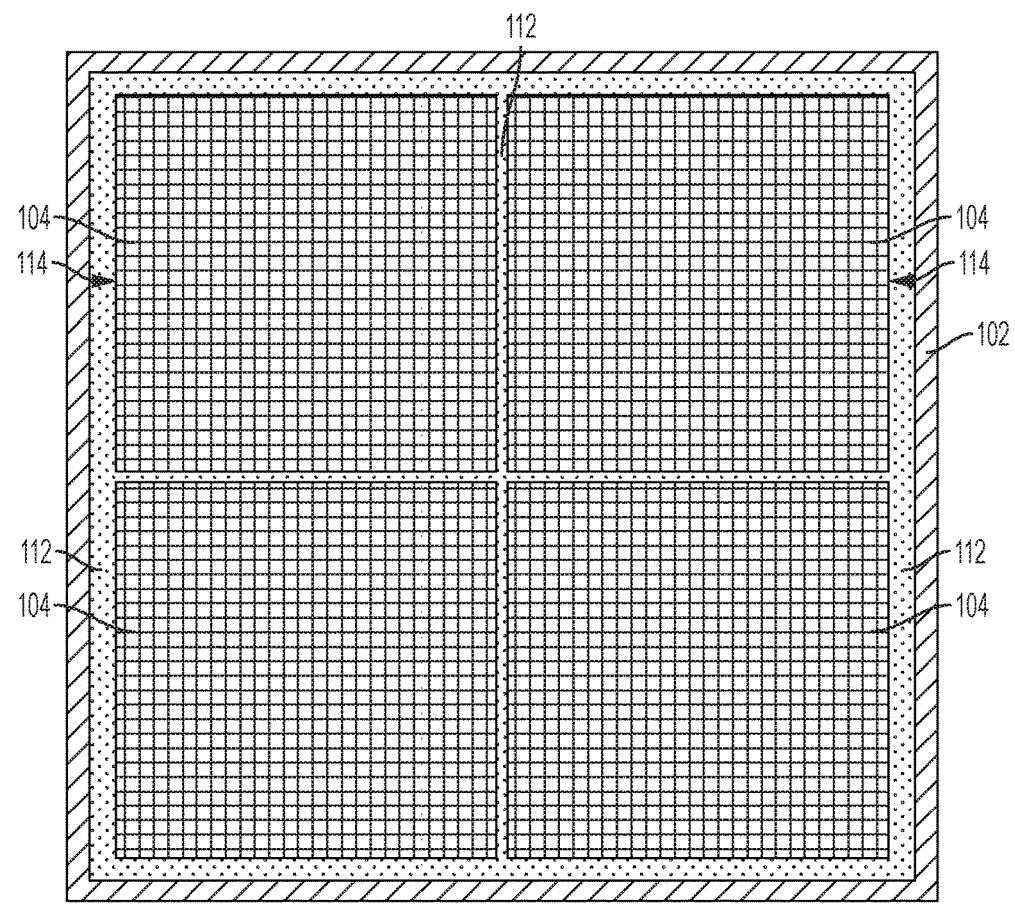
FIG. 2 is a cross section view of the after-treatment device shown in FIG. 1.

An outline view of an after-treatment device 100 in accordance with the disclosure is shown in FIG. 1. The after-treatment device includes a substrate enclosure 102 that surrounds and supports one or more substrates 104, as shown in FIG. 2. In the illustrated embodiment, the substrates 104 have a square cross sectional shape, but it should be appreciated that substrates having rectangular, round or oval shapes are contemplated to fall within the scope of the present disclosure. The substrates 104 are arranged in a bundle 106 of four substrates, but fewer or more than four substrates 104 can also be used depending on the amount and pressure drop of exhaust gas is required for a particular application. The after-treatment device 100 is configured for use along a path of exhaust gas provided by and engine (not shown) during operation. For this reason, and to facilitate the connection of the after-treatment device to pipes or conduits, the substrate enclosure 102 includes inlet and outlet diffusers 105 that converge or diverge between the substrate enclosure and inlet and outlet flanges 108, each of which surrounds a gas inlet or outlet opening 110. In this way, exhaust gas provided through an opening 110 may pass through the substrates 104 for treatment before being collected and exits the after-treatment device through the opposite opening 110.

As can be seen in FIG. 2, the substrates 104 are suspended or retained within the enclosure 102 by a compressible or collapsible mat layer 112, which extends around and between lateral faces 114 of the substrates 104. As can be appreciated, the end faces of the substrates 104 are open for gas entry and exit as the gas passes longitudinally through the substrates 104 during service. The collapsible mat layer 112 may be made from a ceramic fiber or other material that maintains its resilience to both suspend and retain the substrates 104 within the enclosure 102 and to also seal against gas leakage around the substrates in the space between the enclosure and the lateral faces 114 of the substrates 104.

Figure 3:
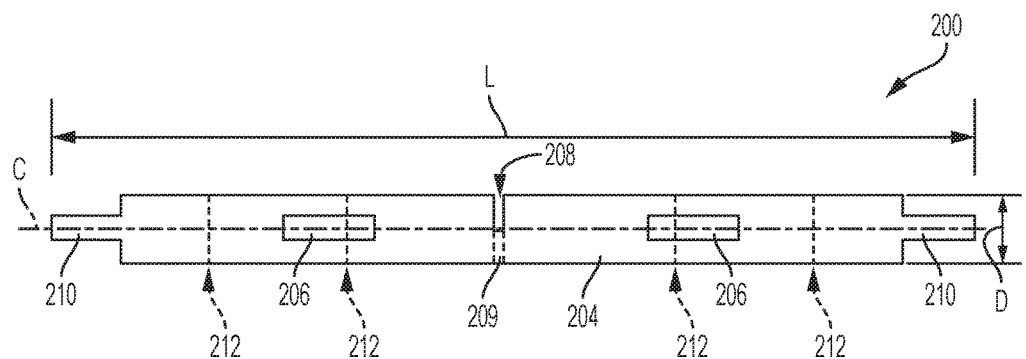
FIG. 3 is a substrate mat in accordance with the disclosure.
Figure 4:
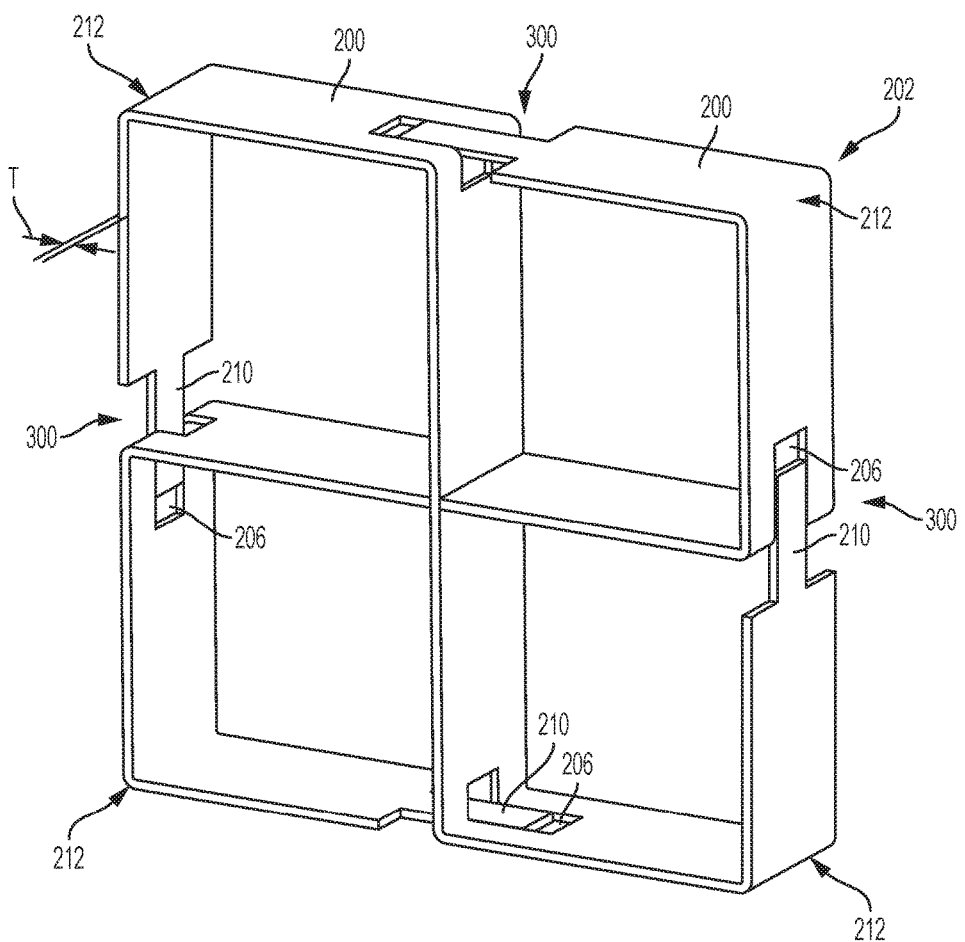
FIG. 4 is an assembly of two substrate mats in accordance with the disclosure.

A substrate mat strip 200 is shown in an unfolded position in FIG. 3 from a side perspective, and an assembly 202 of two mat strips 200 is shown in an assembled configuration in FIG. 4. The substrate mat strip 200 includes an elongate section 204 having a length, L, and a width, D. In the illustrated embodiment, the elongate section 204 includes two openings 206 and a central slot 208. Each of the openings has a rectangular shape and extends through an entire thickness, T, of the elongate section 204 along a centerline, C, thereof, when the strip 200 is in a flat or unfolded condition on a flat surface. Each opening has a width, which in the illustrated embodiment is about equal to D/3, i.e., a third of the width of the elongate section 204, and a length that is about equal to four times its length, or about 4/3 times the width, D. Each opening is located centrally along the centerline C in a widthwise direction, and is axially disposed along the length L at about one third of the total length of the elongate section, as measured from either end, such that the placement of the two openings 206 separates the strip 200 into three portions of equal length. The central slot 208 extends perpendicular to the centerline C at about the middle of the length L of the strip 200, has a width that is about equal to the thickness, T, and a length that is half the width D. A remaining portion of the material of the strip that axially is coextending with the central slot 208 and occupies the remaining half of the width D of the strip can be defined as an engagement portion 209.

Figure 5:
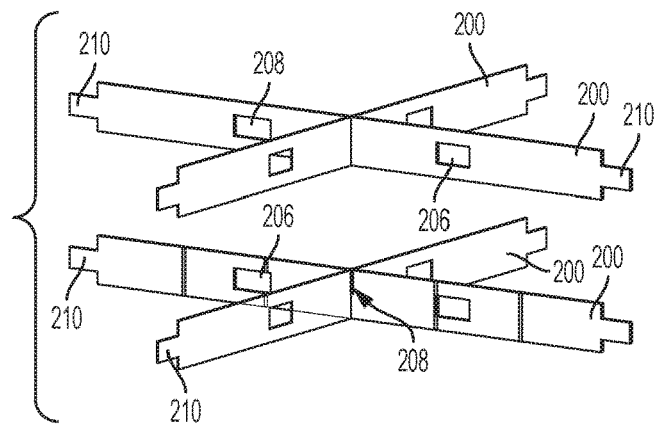
FIGS. 5, 6 and 7 are outline views of an installation of substrate mats around a bundle of substrates in accordance with the disclosure.
Figure 6:
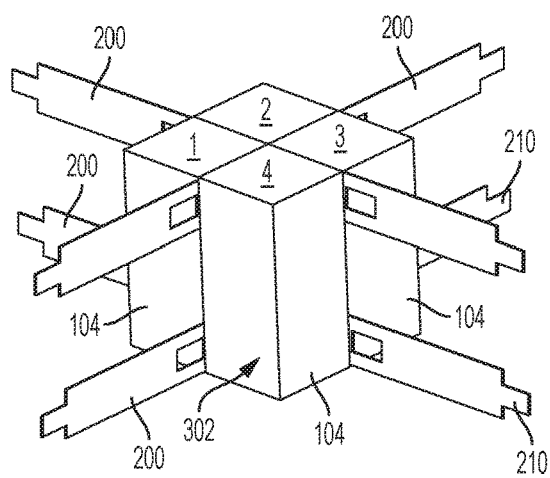
Figure 7:
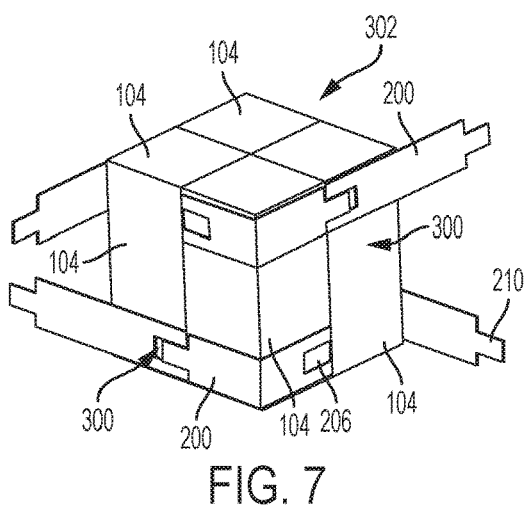

Each strip 200 further includes two tongues 210, which extend past the ends of the strip 200. As shown in FIG. 3, each tongue 210 is formed as a reverse of the openings 206 in that it is formed by a strip of material having a length of about 4/3 D and a width of D/3.When the strip 200 is in an assembled position, as shown in FIG. 4, two strips are connected by inserting each strip's engagement portion 209 into the other strip's central slot 208 such that, when fully seated, the two strips extend over a width, D. Each strip is then folded at each of four creases 212 to form a rectangular shape or, as shown in FIG. 4, two open square shapes that are sufficiently sized to wrap around three sides of a substrate 104. An assembly sequence in this respect is shown in FIGS. 5, 6 and 7. The dimensions of the various features are selected according to the materials used to construct the strip 200. For example, the width of the two openings 206 substantially matches the width of the tongue 210, and length of the corresponding openings and tongues is selected based on the expected variation of the circumference or periphery of the substrates.

In reference to FIGS. 4-7, it can be seen that a total length of each strip is about six times that of a side of a square substrate, but other lengths can be used. Similarly, the width and/or the number of strips used to surround the substrates may be increased to achieve a desired coverage of the exterior of the bundles with material. In the illustrated embodiment, each strip extends across two substrates along its middle portion, and wraps around to additional sides of one of the substrates such that, when both strips have been assembled, all four sides of four substrates have been wrapped. In the assembly procedure shown in FIGS. 4-7, two pairs of strips are used to bundle four substrates ,which can then be inserted into an enclosure. The four substrates are numbered as "1, 2, 3" and "4" in FIG. 6.

To account for variability in the height or width dimension of the substrates, in the assembled position, the tongues 210 at the ends of the two strips 200 are arranged to at least partially overlap with the corresponding openings 206. More specifically, as shown in FIG. 4, the tongues 210 on one of the strips 200 in a pair overlap with the openings 206 in the other strip 200 of the pair of strips 200. Overlapping regions 300 between the tongues 210 and the openings 206 are arranged to be located between two adjacent substrates 104 and in the middle of each of the sides of a combined substrate bundle 302, as shown in FIG. 7.

INDUSTRIAL APPLICABILITY

Figure 8:
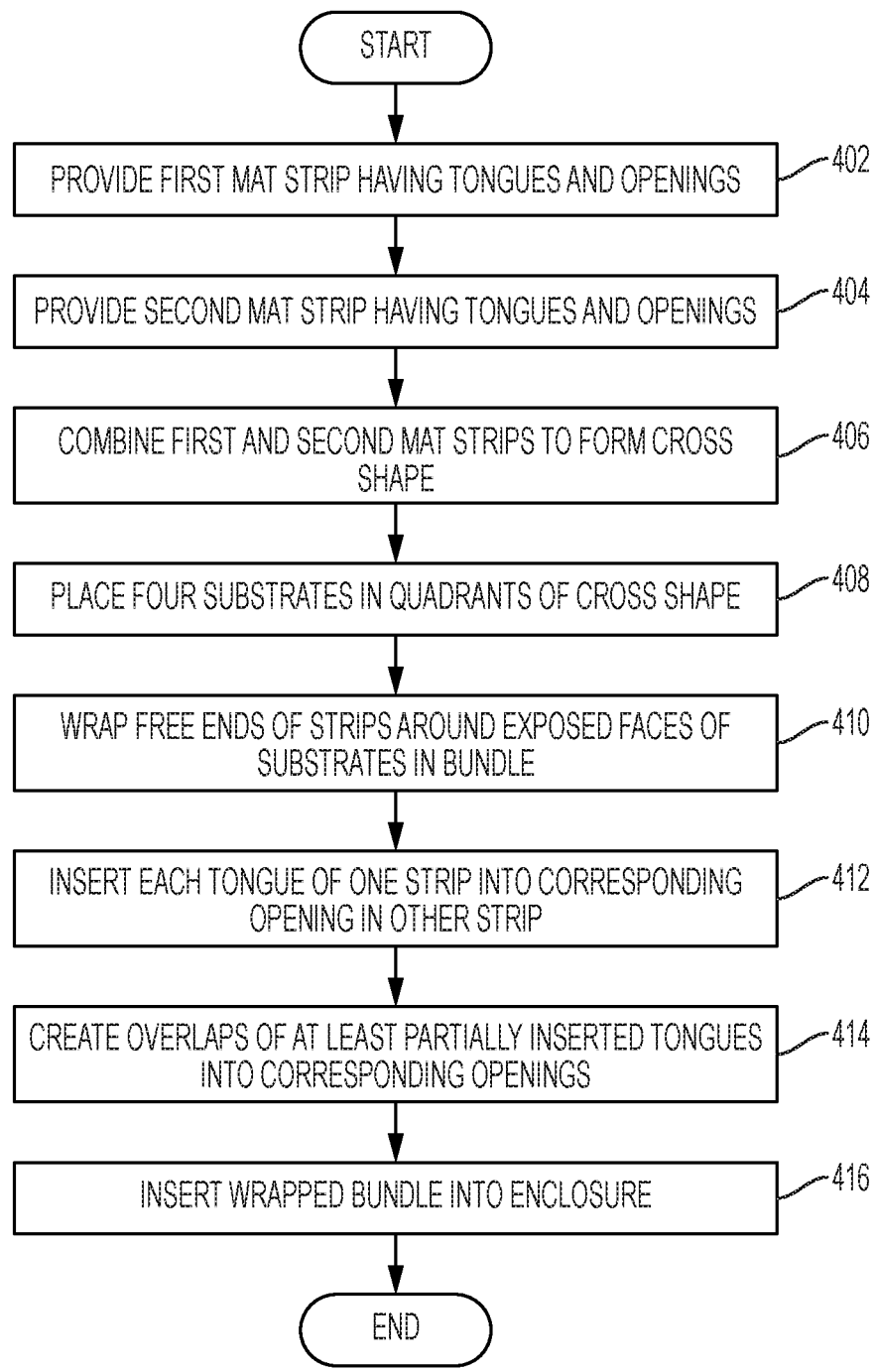
FIG. 8 is a flowchart for a method in accordance with the disclosure.

The present disclosure is applicable to after-treatment devices that include substrates packed into enclosures or cans by use of a mat placed between the substrates and the enclosure to retain, seal, insulate and/or otherwise provide a retaining function between the enclosure and the substrate or a bundle of substrates. A flow chart for a method of assembling a bundle of substrates for placement into an enclosure is shown in FIG. 8. The method includes providing a mat formed as an elongate strip that includes a tongue at each end and two openings formed along an axial length of the strip at predefined axial locations at 402. A second strip is provided at 404, and the two strips are combined or weaved together at 406 to form a cross-shape. Four substrates are placed in the quadrant areas of the cross at 408 and the free ends of the strips are wrapped, in the same direction, around the remaining two lateral sides of each of the substrates in the bundle at 410.

In accordance with the process, each tongue at each respective end of each strip is inserted into a corresponding opening in the other of the pair of strips at 412. By inserting the tongue into the opening, an overlap is created at 414 that ensures that sealing around the entire periphery of each of the substrates in the bundle is achieved. The wrapping process may be repeated for a second or third set of strips applied at different locations along the length of the substrate bundle before the bundle is inserted into a can or enclosure at 416. One advantageous result from wrapping and overlapping the mats is that a layer of matting is applied around and between the substrates that presents a uniform thickness, T (see FIG. 4), which can result in a generally uniform compression of the mat material around and between the substrates. The overlapping also compensates for variations in the outer dimensions of the substrates, i.e. a larger degree of overlap will result for smaller dimensions and a lesser degree of overlap will result for larger dimensions of the substrates without the need for cutting or otherwise adjusting the mats, thus making assembly quicker and more cost efficient.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. An after-treatment device, comprising:
   an enclosure configured to be disposed along an exhaust conduit of an engine, the enclosure having inlet and outlet openings;
   at least two substrates disposed in the enclosure, each of the at least two substrates having two axial ends configured to be in fluid communication with the inlet and outlet openings, and four lateral surfaces that face an inner portion of the enclosure;
   a first mat having an elongate shape, the first mat being disposed at least partially around each of the at least two substrates, the first mat forming a first tongue at one end and a first opening along a first length thereof;
   a second mat having an elongate shape, the second mat being disposed at least partially around each of the at least two substrates, the second mat forming a second tongue at one end and a second opening along a second length thereof;
   wherein the first mat and the second mat are entwined, each being in contact with at least three of the four lateral surfaces of each of the at least two substrates; and
   wherein the first mat and the second mat at least partially overlap such that the first tongue is disposed at least partially in the second opening and the second tongue is disposed at least partially in the first opening to form a continuous layer around all lateral surfaces of each of the at least two substrates.

2. The after-treatment device of claim 1, further comprising two additional substrates such that a bundle of four substrates is disposed in the enclosure, wherein each of the first mat and the second mat are entwined to form the continuous layer around all four lateral surfaces of each of the four substrates of the bundle.

3. The after-treatment device of claim 2, wherein each of the first mat and the second mat further includes a central slot extending perpendicularly relative to a centerline over half a width of the elongate shape of the first mat and the second mat.

4. The after-treatment device of claim 3, wherein the first mat and the second mat are entwined such that second mat is disposed in the central slot of the first mat and the first mat is disposed in the central slot of the second mat.

5. The after-treatment device of claim 2, wherein the first mat further includes an additional first tongue at an opposite end of the first tongue and an additional first opening disposed symmetrically to the first opening along a length of the first mat.

6. The after-treatment device of claim 5, wherein the first mat and the second mat at least partially further overlap such that the additional first tongue is at least partially disposed within the additional second opening, and wherein the additional second tongue is at least partially disposed within the additional first opening.

7. The after-treatment device of claim 1, wherein the first mat and the second mat are made from a ceramic fiber fabric material.

8. The after-treatment device of claim 1, wherein each of the at least two substrates has a peripheral dimension that is subject to a tolerance variation, and the first mat and the second mat are configured to overlap more for a smaller peripheral dimension and less for a larger peripheral dimension.

9. The after-treatment device of claim 1, wherein each of the first and second mats has an elongate strip shape having a width, D, a length, L, and a thickness, T.

10. The after-treatment device of claim 9, wherein the first opening has a rectangular shape having a width that is equal to D/3 and a length that is at least D.

11. The after-treatment device of claim 10, wherein the first tongue has a rectangular shape having a length that is at least D and a width that is equal to D/3.

* * * * *